United States Patent [19]

Sakakibara

[11] Patent Number: 5,791,745
[45] Date of Patent: Aug. 11, 1998

[54] BRAKE PRESSURE CONTROL SYSTEM WITH THE CONTROLLED PUMP FOR FILLING ACCUMULATOR

[75] Inventor: Yuichiro Sakakibara, Hekinan, Japan

[73] Assignee: Aisin Seiki Kabushik Kaisha, Kariya, Japan

[21] Appl. No.: 644,579

[22] Filed: May 10, 1996

[30] Foreign Application Priority Data

May 12, 1995 [JP] Japan .................................. 7-114888

[51] Int. Cl.⁶ .................................................. B60J 8/32
[52] U.S. Cl. .................. 303/11; 303/113.4; 303/116.1; 303/DIG. 3; 303/DIG. 4
[58] Field of Search .................. 303/10, 11, DIG. 1–4, 303/116.1, DIG. 2, 114.1

[56] References Cited

U.S. PATENT DOCUMENTS

| | | | |
|---|---|---|---|
| 4,914,917 | 4/1990 | Schonlau | 303/113.4 |
| 5,197,787 | 3/1993 | Matsuda et al. | 303/11 |
| 5,221,125 | 6/1993 | Okochi et al. | 303/113.4 |
| 5,487,593 | 1/1996 | Potts et al. | 303/11 |
| 5,547,265 | 8/1996 | Harris et al. | 303/11 |

FOREIGN PATENT DOCUMENTS 2233412   1/1991   United Kingdom .................. 303/11

OTHER PUBLICATIONS

Toyota Crown Majesta, E–JZS149, E–EUZS141, published Oct. 11, 1991, pp. 3–98 through 3–101.
Mazda Service Manual (FAMILIA), published Aug. 1989, pp. P–11 through P–17, P–29.

*Primary Examiner*—Matthew C. Graham
*Attorney, Agent, or Firm*—Burns, Doane, Swecker & Mathis, LLP

[57] ABSTRACT

A wheel brake pressure supplying device for supplying fluid pressure for a wheel brake cylinder of a wheel on an automotive vehicle includes a reservoir, a pump, a motor, an accumulator connected to the wheel brake cylinder, a fluid pressure sensor, an electric source, an operation time determining device and a motor control device. The reservoir stores a fluid and the pump is connected to the reservoir for pumping fluid in the reservoir. The motor operates the pump and the accumulator is connected to the pump for storing the fluid pumped by the pump so that fluid pressure in the accumulator increases through operation of the pump. The fluid pressure sensor senses when the fluid pressure in the accumulator is less than a predetermined pressure. The electric source is connected to the motor for supplying voltage to the motor and the operation time determining device determines a target operation time of the motor based on the voltage of the electric source. The motor control device starts the operation of the motor when the fluid pressure in the accumulator is less than the predetermined pressure and terminates the operation of the motor when the operation time of the motor reaches the target operation time.

14 Claims, 5 Drawing Sheets

BRAKE PRESSURE CONTROL SYSTEM WITH THE CONTROLLED PUMP FOR FILLING ACCUMULATOR

FIELD OF THE INVENTION

The present invention generally relates to a pressure producing device and more particularly to a hydraulic braking pressure control device for an automotive vehicle.

BACKGROUND OF THE INVENTION

A conventional pressure producing device is disclosed in an explanation manual of a new model car (CROWN MAJESTA) published on Oct. 11, 1991. The device includes a reservoir, a pump, an accumulator, a motor, a fluid pressure sensor, and a motor control device.

The reservoir stores brake fluid and is connected to the inlet of the pump. The outlet of the pump is connected to the accumulator. The pump draws brake fluid from the reservoir and pumps the brake fluid to the accumulator to increase the fluid pressure in the accumulator. The motor is connected to the pump to drive the pump.

The fluid pressure sensor is connected to the accumulator and senses the fluid pressure in the accumulator. The fluid pressure sensor includes a diaphragm, a strain gauge and an electric circuit. The diaphragm receives the fluid pressure in the accumulator and generates a strain corresponding to the fluid pressure in the accumulator. The strain gauge converts the strain of the diaphragm into a linear electric signal and the electric circuit converts the linear electric signal into a switch signal. The switch signal is turned on when the fluid pressure in the accumulator is lower than a first predetermined pressure (about 150 kg/cm$^2$) and is turned off when the fluid pressure in the accumulator exceeds a second predetermined pressure (about 185 kg/cm$^2$) which is higher than the first predetermined pressure. The motor control device starts the operation of the motor when the switch signal is turned on and terminates the operation of the motor when the switch signal turns off.

However, the above-described device suffers from the disadvantage that it utilizes a fluid pressure sensor having the strain gauge which results in an expensive device.

To reduce the cost associated with the foregoing system, a proposal has been made to replace the fluid pressure sensor with a fluid pressure switch. In this case, the fluid pressure switch turns on when the fluid pressure in the accumulator is lower than the first predetermined pressure so that the motor control device initiates the motor operation. Also, the fluid pressure switch turns off when the fluid pressure in the accumulator exceeds the second predetermined pressure which is higher than the first predetermined pressure so that the motor control device terminates the operation of the motor.

However, in this system, the pressure at which the pressure switch turns on and the pressure at which the pressure switch turns off varies in response to the environmental temperature due to mechanical reasons. That is, in the situation in which the environmental temperature is relatively low, the first predetermined pressure tends to decrease while the second predetermined pressure tends to increase. As a result, the operation time of the motor varies in response to the environmental temperature. Therefore, the total fluid volume stored in the accumulator while the motor is operated varies in response to the environmental temperature.

SUMMARY OF THE INVENTION

A need exists, therefore, for a pressure producing device which addresses at least the foregoing drawbacks of the prior art.

According to one aspect of the present invention, a pressure producing device for producing a fluid pressure includes a reservoir for storing a fluid, a pump connected to the reservoir for pumping fluid in the reservoir, a motor connected to the pump for operating the pump, an accumulator connected to the pump for storing fluid pumped by the pump so that fluid pressure in the accumulator increases through operation of the pump, a fluid pressure sensing device for sensing when the fluid pressure in the accumulator is less than a predetermined pressure, an electric source electrically connected to the motor for supplying voltage to the motor, and an operation time determining device for determining a target operation time of the motor based on the voltage of the electric source. A motor controller starts the operation of the motor when the fluid pressure in the accumulator is less than the predetermined pressure determined by the fluid pressure sensing device and for terminating operation of the motor when an operation time of the motor reaches the target operation time determined by the operation time determining device.

Another aspect of the present invention involves a wheel brake fluid pressure supplying device for supplying fluid pressure to a wheel brake cylinder of a wheel on an automotive vehicle that includes a wheel brake cylinder, an accumulator connected to the wheel brake cylinder, a reservoir for storing brake fluid to be supplied to the accumulator, a pump connected to the reservoir and the accumulator for pumping fluid from the reservoir to the accumulator to increase fluid pressure in the accumulator, a motor connected to the pump for effecting operation of the pump, and a motor control device connected to the motor to initiate operation of the motor when the fluid pressure in the accumulator is below a predetermined pressure and to cease operation of the motor once said motor has been operating for a predetermined period of time.

According to a further aspect of the present invention, a hydraulic braking pressure control device for an automotive vehicle having a wheel includes a wheel brake cylinder, a hydraulic pressure generating device, a reservoir, a pump, a motor, an accumulator, a change over valve, a hydraulic braking pressure sensing device, an electric source, an operation time determining arrangement, and a motor control device. The wheel brake cylinder is operatively connected to the wheel for applying a braking force to the wheel. The hydraulic pressure generating device generates hydraulic pressure in response to the depression of the brake pedal and supplies the hydraulic pressure to the wheel brake cylinder. The pump is connected to the reservoir which stores brake fluid for pumping the brake fluid in the reservoir, and the motor operates the pump. The accumulator is connected to the pump for storing brake fluid pumped by the pump so that the hydraulic braking pressure in the accumulator increases through operation of the pump. The change over valve is connected to the hydraulic pressure generating device, the wheel brake cylinder and the accumulator. The change over valve is positionable in a first position in which the wheel brake cylinder communicates with the hydraulic pressure generating device and a second position in which the wheel brake cylinder is prevented from communicating with the hydraulic pressure generating device and communicates with the accumulator. The hydraulic braking pressure sensing device senses when the hydraulic braking pressure in the accumulator is less than a predetermined pressure. The electric source is electrically connected to the motor for supplying voltage to the motor and the operation time determining arrangement determines a target operation time of the motor based on the voltage of the electric source. The motor control device starts the operation of the motor when the hydraulic braking pressure in the accumulator is less than the predetermined pressure and terminates the operation of the motor when the operation time of the motor reaches the target operation time determined by the operation time determining arrangement.

BRIEF DESCRIPTION OF THE DRAWING FIGURES

The foregoing and additional features of the present invention will become more apparent from the following detailed description of a preferred embodiment when considered with reference to the attached drawing figures, in which like element are designated by like reference numerals and wherein.

DETAILED DESCRIPTION OF THE PREFERRED EMBODIMENT

Figure 2:
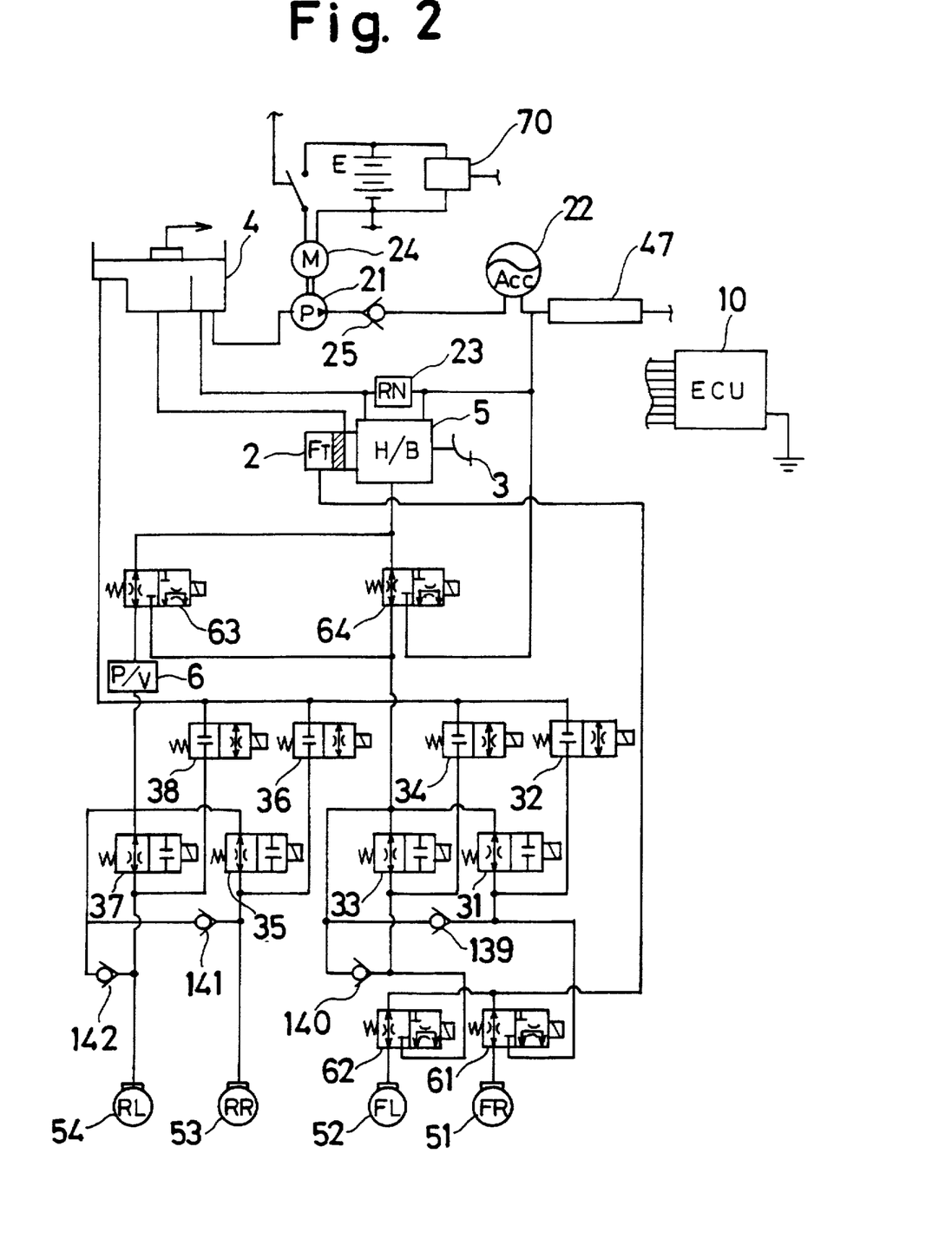
FIG. 2 is a circuit diagram of a hydraulic braking pressure control device according to an embodiment of the present invention.

Hereinafter the hydraulic braking pressure control device of an embodiment in accordance with the present invention is explained with reference to FIG. 2 to FIG. 5. Referring initially to FIG. 2, the hydraulic braking pressure control device of the present invention includes a master cylinder 2. The master cylinder 2 is connected to a reservoir 4 and generates hydraulic pressure in response to the depression of a brake pedal 3. The reservoir 4 stores brake fluid and is connected to the inlet of a pump 21. The outlet of the pump 21 is connected to an accumulator 22 via a check valve 25. The pump 21 draws brake fluid from the reservoir 4 and pumps the brake fluid to the accumulator 22 to increase the fluid pressure in the accumulator 22. The accumulator 22 is also connected to a brake booster 5. The brake booster 5 receives the hydraulic braking pressure in the accumulator 22 and converts it into a hydraulic braking pressure corresponding to the amount of depression of the brake pedal 3.

A front right wheel brake cylinder 51 is operatively connected to a front right wheel FR and applies a braking force to the front right wheel FR. The front right wheel brake cylinder 51 is connected to the master cylinder 2 via a change over solenoid valve 61 and is connected to the brake booster 5 via the change over solenoid valve 61, a normally open solenoid valve 31 and a change over solenoid valve 64. Further, the front right wheel brake cylinder 51 is connected to the reservoir 4 via the change over solenoid valve 61 and a normally closed solenoid valve 32.

The change over valve 61 is positionable in a non-operation position and an operation position. When the change over valve 61 is positioned in the non-operation position, it allows the front right wheel brake cylinder 51 to communicate with the master cylinder 2. When the change over valve 61 is positioned in the operation position, it prevents the front right wheel brake cylinder 51 from communicating with the master cylinder 2 and allows the front right wheel brake cylinder 51 to communicate with the brake booster 5.

A front left wheel brake cylinder 52 is operatively connected to a front left wheel FL and applies a brake force to the front left wheel FL. The front left wheel brake cylinder 52 is connected to the master cylinder 2 via a change over solenoid valve 62 and is connected to the brake booster 5 via the change over solenoid valve 62, a normally open solenoid valve 33 and the change over solenoid valve 64. Further, the front left wheel brake cylinder 52 is connected to the reservoir 4 via the change over solenoid valve 62 and a normally closed solenoid valve 34. The change over valve 62 is positionable in a non-operation position and an operation position. When the change over valve 62 is positioned in the non-operation position, it allows the front left wheel brake cylinder 52 to communicate with the master cylinder 2. When the change over valve 62 is positioned in the operation position, it prevents the front left wheel brake cylinder 52 from communicating with the master cylinder 2 and allows the front left wheel brake cylinder 52 to communicate with the brake booster 5.

The change over valve 64 is positionable in a non-operation position and an operation position. When the change over valve 64 is positioned in the non-operation position, it allows the front wheel brake cylinders 51, 52 to communicate with the brake booster 5. When the change over valve 64 is positioned in the operation position, it prevents the front wheel brake cylinders 51, 52 from communicating with the brake booster 5 and allows the front wheel brake cylinders 51, 52 to communicate with the accumulator 22.

A rear right wheel brake cylinder 53 is operatively connected to the rear right wheel RR and applies a brake force to the rear right wheel RR. The rear right wheel brake cylinder 53 is connected to the brake booster 5 via a normally open solenoid valve 35 and a change over solenoid valve 63 and is connected to the reservoir 4 via a normally closed solenoid valve 36.

A rear left wheel brake cylinder 54 is operatively connected to the rear left wheel RL and applies a brake force to the rear left wheel RL. The rear left wheel brake cylinder 54 is connected to the brake booster 5 via a normally open solenoid valve 37 and the change over valve 63 and is connected to the reservoir 4 via a normally closed solenoid valve 38.

The change over valve 63 is positionable in a non-operation position and an operation position. When the change over valve 63 is positioned in the non-operation position, the rear wheel brake cylinders 53, 54 are permitted to communicate with the brake booster 5. When the change over valves 63, 64 are positioned in the operation position, they prevent the rear wheel brake cylinders 53, 54 from communicating with the brake booster 5 and allow the rear wheel brake cylinders 53, 54 to communicate with the accumulator 22.

The solenoid valves 31 to 38 and 61 to 64 are operated by an electronic control unit 10 (hereinafter referred to as the ECU). A pair of check valves 139, 140 is provided for returning the hydraulic braking pressures of the wheel brake cylinders 51, 52 to the brake booster 5, respectively when the brake pedal 3 is released and when the solenoid valves 61, 62 are operated. Also, a pair of check valves 141, 142 is provided for returning the hydraulic braking pressures of the wheel brake cylinders 53, 54 to the brake booster 5, respectively when the brake pedal 3 is released.

A proportioning valve 6 is provided for decreasing the hydraulic braking pressure of the rear wheel brake cylinders 53, 54 during normal braking operation. A relief valve 23 is connected to the accumulator 22 and the reservoir 4. The relief valve 23 relieves the hydraulic braking pressure in the accumulator 22 to the reservoir 4 when the hydraulic braking pressure in the accumulator 22 exceeds a predetermined high pressure.

A motor 24 is connected to the pump 21 to drive the pump 21. The motor 24 is electrically connected to an electric source E. The electric source E supplies voltage to the motor 24. A voltage sensor 70 is connected to both ends of the electric source E. The voltage sensor 70 senses the voltage of the electric source E and supplies a corresponding voltage signal to the ECU 10. A fluid pressure sensing device in the form of a pressure switch 47 is connected to the accumulator 22. The pressure switch 47 senses when the hydraulic braking pressure in the accumulator 22 is less than a predetermined pressure. In other words, the pressure switch 47 turns on when the hydraulic braking pressure in the accumulator 22 is less than the predetermined pressure and supplies an ON-signal to the ECU 10.

Figure 1:
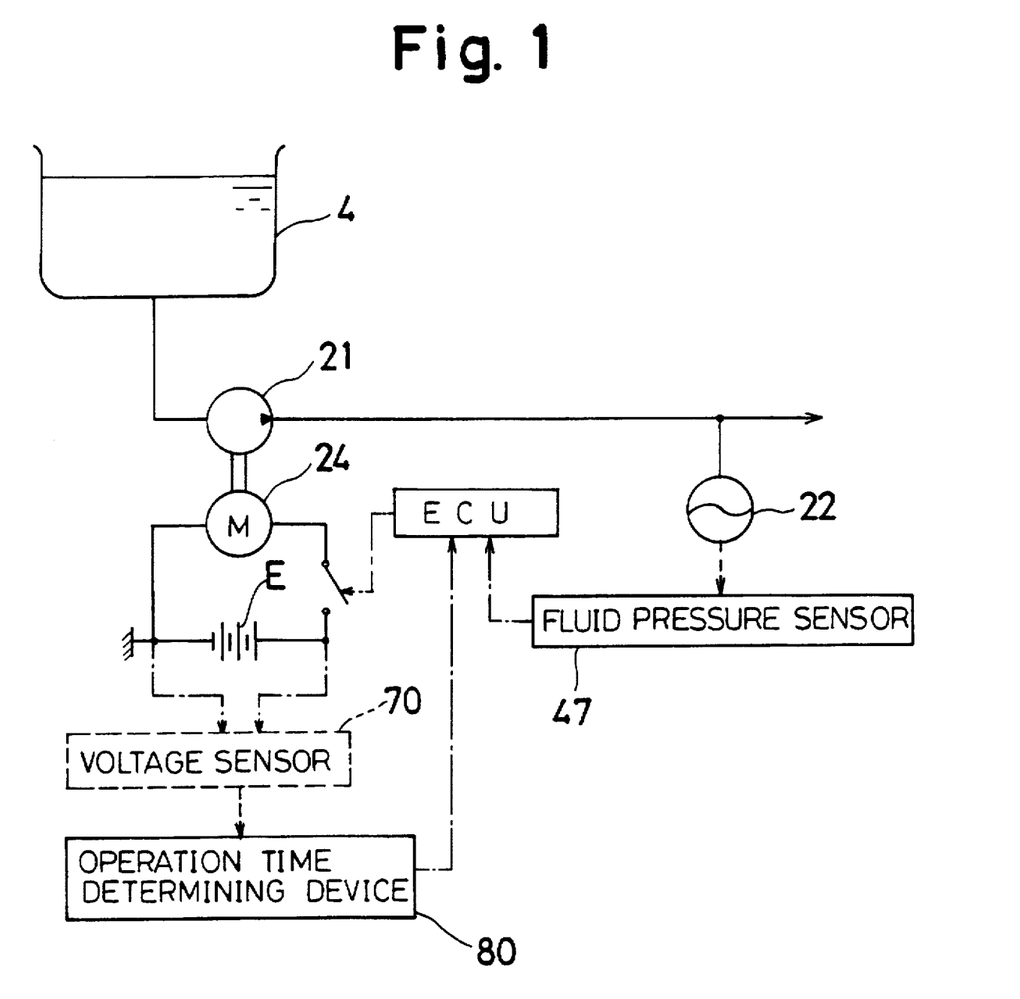
FIG. 1 is a general block diagram illustrating a pressure producing device of the present invention.

FIG. 1 illustrates additional details associated with the system for controlling operation of the motor 24 that drive the pump 21. The voltage sensor 70 is connected to an operation time determining device 80. The voltage sensor 70 sends a signal to the operation time determining device 80 that is indicative of the voltage being supplied to the motor 24. As described in more detail below, the operation time determining device 80 sets a target operation time which represents the length of time the motor 24 will be operated. This target operation time is set on the basis of the voltage signal received by the operation time determining device 80 from the voltage sensor 70. The target operation time set by the operation time determining device 80 is sent to the ECU 10 which then controls the length of time the motor 24 is rendered operational.

Hereinafter, the operation of the present invention in the context of traction control and stability control in which the hydraulic braking pressure in the accumulator 22 is used are explained.

When the rear wheels RR, RL corresponding to driven wheels slip during depression of the accelerator pedal (not shown), the change over valves 63, 64 are operated by the ECU 10, so that the rear wheel brake cylinders 53, 54 communicate with the accumulator 22. As a result, the hydraulic braking pressure in the accumulator 22 is supplied to the rear wheel brake cylinder 53, 54 and the hydraulic braking pressures of the rear wheel brake cylinder 53, 54 are increased. Therefore, the slip of the rear wheels RR, RL is decreased.

When the vehicle slips in the lateral direction thereof when the vehicle turns a corner of a road, for example, the change over valves 61, 64 are operated by the ECU 10, so that the front right wheel brake cylinder 51 communicates with the accumulator 22. As a result, the hydraulic braking pressure in the accumulator 22 is supplied to the front right wheel brake cylinder 51. Therefore, the slip of the vehicle in the lateral direction is decreased.

After the hydraulic braking pressure in the accumulator 22 is used in the traction control and the stability control, the hydraulic braking pressure in the accumulator 22 is decreased.

The program routine executed by the ECU 10 for controlling the operation of the motor 24 is explained with reference to FIG. 4.

Figure 4:
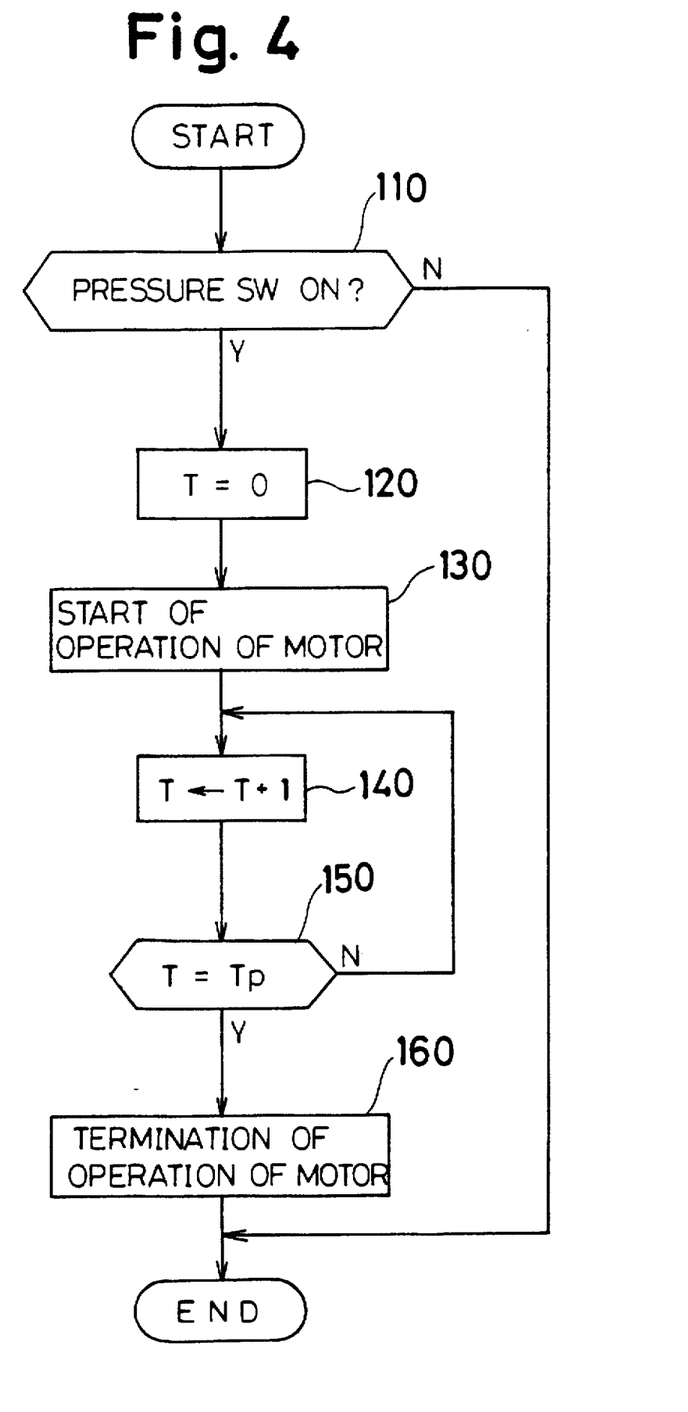
FIG. 4 is a flowchart of the motor control process performed by the electronic control unit shown in FIG. 2.

As shown in FIG. 4, it is determined at step 110 whether or not the pressure switch 47 is on. In other words, it is determined whether or not the ON-signal is supplied from the pressure switch 47. If so, at step 120 the operation time T of a timer associated with the duration of operation of the motor 24 is reset and the program proceeds to step 130. At step 130 the operation of the motor 24 is started and at step 140 the operation time T of the motor 24 is increased by a predetermined increment. At step 150, it is determined whether or not the operation time T of the motor 24 has reached the target operation time Tp of the motor 24. If not, steps 140, 150 are repeated until the operation time T equals the target operation time Tp. When the operation time T equals the target operation time Tp, the operation of the motor 24 is terminated at step 160.

Figure 3:
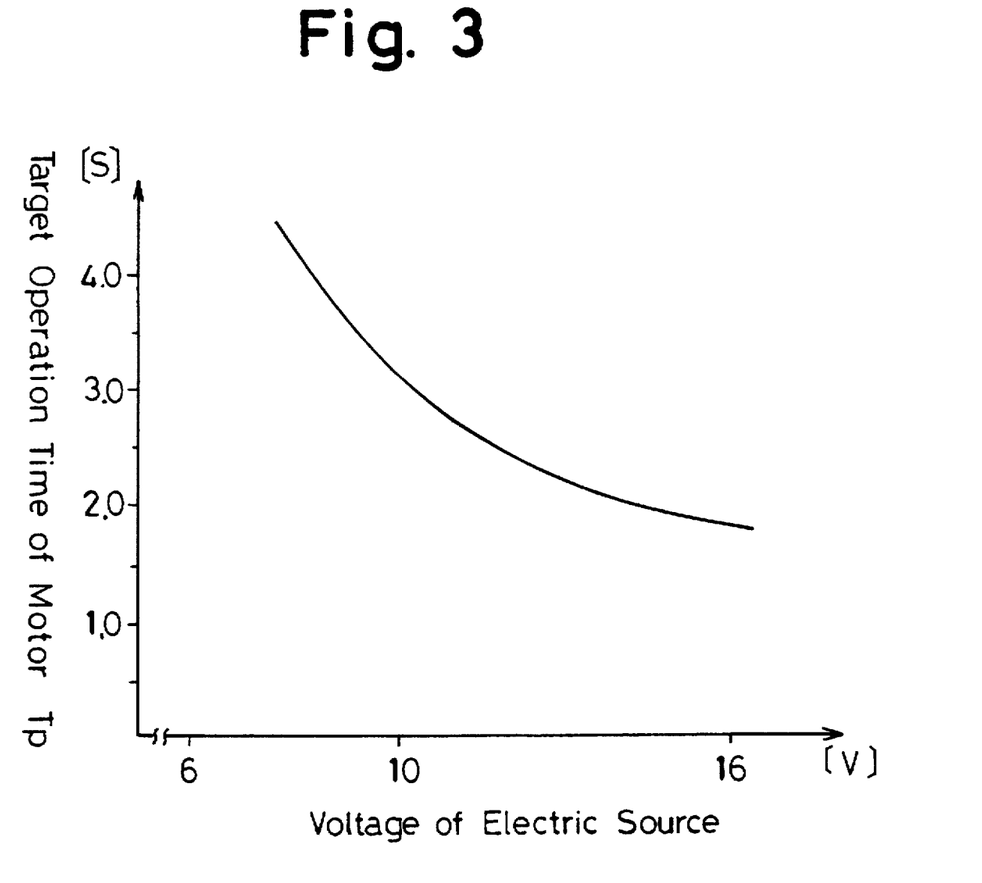
FIG. 3 is a graph illustrating the relationship between the voltage of the electric source and the operation time of the motor.

The target operation time Tp is determined before the program shown in FIG. 4 is executed. The target operation time Tp is determined on the basis of the voltage signal corresponding to the voltage of the electric source E sensed by the voltage sensing means 70. The relationship between the voltage of the electric source E and the target operation time Tp is shown in FIG. 3. The graph shown in FIG. 3 is derived by experimentally determining, for a vehicle of a given size, how long the motor 24 should operate in order to pump a desired volume of fluid into the accumulator 22 (e.g., sufficient fluid to allow the accumulator fluid to be used several times before the operation of the pump 21 once again becomes necessary). Thus, for example, when the pressure switch 47 is turned on, there is a known volume of fluid in the accumulator 22. By operating the motor 24 at a given voltage, it is possible to determine the length of time (i.e., the target operation time Tp) the motor 24 should be operated in order to reach the desired volume of fluid in the accumulator 22. This target operation time Tp of the motor 24 can then be derived for different voltages to thereby result in the graph shown in FIG. 3.

As shown in FIG. 3, the target operation time Tp of the motor 24 decreases as the voltage of the electric source E increases since the rotational speed of the motor 24 increases as the voltage of the electric source E increases.

Figure 5:
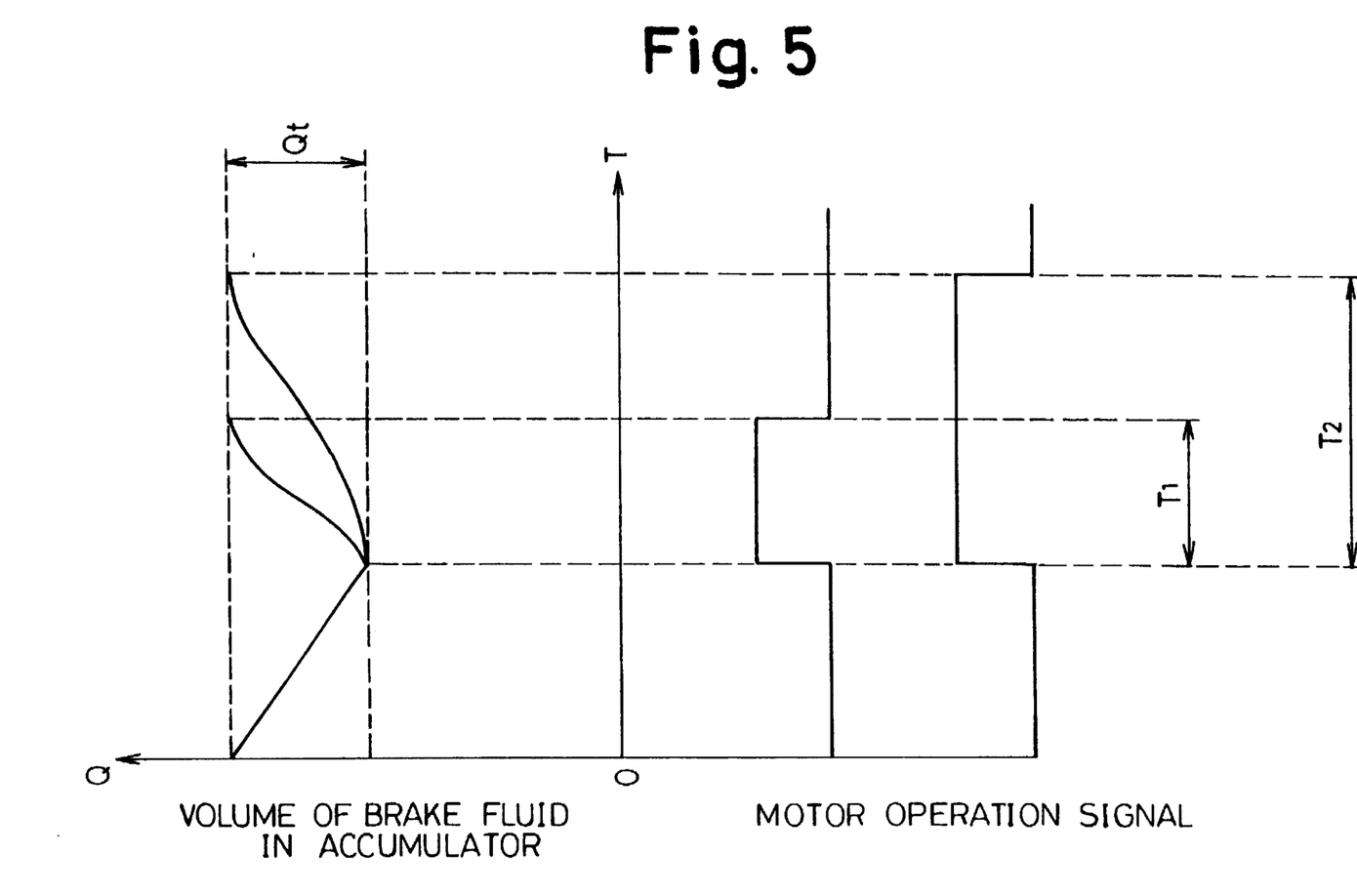
FIG. 5 is a time chart showing the fluid volume stored in the accumulator while the motor is operated.

The graph in FIG. 5 illustrates the motor 24 operating for a time Ti when the voltage supplied to the motor 24 is relatively high and also illustrates the motor 24 operating for a time T2 when the voltage supplied to the motor 24 is relatively low. Since the volume of fluid Qt pumped into the accumulator 22 from the time the pressure switch 47 is turned on is determined on the basis of the operation time of the motor 24 (and the pump 21) rather than when the pressure in the accumulator 22 reaches a predetermined pressure, fluctuations in the environmental temperature do not adversely affect operation of the braking system of the present invention to the same extent as in the prior art. Even if the environmental temperature varies, the amount of fluid Qt pumped into the accumulator 22 remains generally constant.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A hydraulic braking pressure control device for an automotive vehicle having a wheel, comprising:

a wheel brake cylinder operatively connected to the wheel for applying a braking force to the wheel;

hydraulic pressure generating means for generating hydraulic pressure in response to depression of a brake pedal and supplying the hydraulic pressure to the wheel brake cylinder;

a reservoir for storing brake fluid;

a pump connected to the reservoir for pumping the brake fluid in the reservoir;

a motor connected to the pump for operating the pump;

an accumulator connected to the pump for storing brake fluid pumped by the pump so that hydraulic braking pressure in the accumulator increases through operation of the pump;

a change over valve connected to the hydraulic pressure generating means, the wheel brake cylinder and the accumulator, the change over valve being positionable in a first position in which the wheel brake cylinder communicates with the hydraulic pressure generating means, and a second position in which the wheel brake cylinder is prevented from communicating with the hydraulic pressure generating means and communicates with the accumulator;

hydraulic braking pressure sensing means for sensing when the hydraulic braking pressure in the accumulator is less than a predetermined pressure;

an electric source electrically connected to the motor for supplying voltage to the motor;

operation time determining means for determining a target operation time of the motor based on the voltage of the electric source; and motor control means for starting operation of the motor when the hydraulic braking pressure in the accumulator is less than the predetermined pressure and for terminating the operation of the motor when an operation time of the motor reaches the target operation time determined by the operation time determining means.

2. A pressure producing device as set forth in claim 1, further comprising voltage sensing means for sensing the voltage of the electric source.

3. A pressure producing device as set forth in claim 2, wherein the operation time determining means determines the target operation time of the motor in such a manner that as the voltage of the electric source increases the target operation time decreases.

4. A pressure producing device as set forth in claim 1, wherein the pressure sensing means is a pressure switch.

5. A pressure producing de vice for producing a fluid pressure, comprising:

a reservoir for storing a fluid;

a pump connected to the reservoir for pumping fluid in the reservoir;

a motor connected to the pump for operating the pump;

an accumulator connected to the pump for storing fluid pumped by the pump so that fluid pressure in the accumulator increases through operation of the pump;

fluid pressure sensing means for sensing when the fluid pressure in the accumulator is less than a predetermined pressure;

an electric source electrically connected to the motor for supplying voltage to the motor;

operation time determining means for determining a target operation time of the motor based on the voltage of the electric source; and motor control means for starting operation of the motor when the fluid pressure in the accumulator is less than the predetermined pressure determined by the fluid pressure sensing means and for terminating operation of the motor when an operation time of the motor reaches the target operation time determined by the operation time determining means.

6. A pressure producing device as set forth in claim 5, further comprising voltage sensing means for sensing the voltage of the electric source.

7. A pressure producing device as set forth in claim 6, wherein the operation time determining means determines the target operation time of the motor in such a manner that as the voltage of the electric source increases the target operation time decreases.

8. A pressure producing device as set forth in claim 5, wherein the pressure sensing means is a pressure switch.

9. A wheel brake fluid pressure supplying device for supplying fluid pressure to a wheel brake cylinder of a wheel on an automotive vehicle, comprising:

a wheel brake cylinder;

an accumulator connected to the wheel brake cylinder;

a reservoir for storing brake fluid to be supplied to the accumulator;

a pump connected to the reservoir and the accumulator for pumping fluid from the reservoir to the accumulator to increase fluid pressure in the accumulator;

a motor connected to the pump for effecting operation of the pump;

a motor control device connected to the motor to initiate operation of the motor when the fluid pressure in the accumulator is below a predetermined pressure and to cease operation of the motor once said motor has been operating for a predetermined period of time; and voltage sensing means for sensing the voltage supplied to the motor, said predetermined period of time being based on the voltage sensed by the voltage sensing means.

10. A wheel brake fluid pressure supplying device as set forth in claim 9, further comprising an accumulator pressure sensing device for sensing the pressure in the accumulator.

11. A wheel brake fluid pressure supplying device as set forth in claim 9, further comprising a pressure sensing device for determining when the pressure in the accumulator has reached said predetermined pressure.

12. A wheel brake fluid pressure supplying device as set forth in claim 9, further comprising motor operation determining means for determining a length of time that said motor has been operating.

13. A fluid pressure supplying device as set forth in claim 9, further comprising means for determining said predetermined period of time.

14. A fluid pressure supplying device as set forth in claim 13, further comprising an electric source connected to the motor to supply voltage to the motor.

* * * * *

UNITED STATES PATENT AND TRADEMARK OFFICE
CERTIFICATE OF CORRECTION

PATENT NO. : 5,791,745
DATED : August 11, 1998
INVENTOR(S) : Yuichiro SAKAKIBARA It is certified that error appears in the above-identified patent and that said Letters Patent is hereby corrected as shown below:

On the title page:
    In Section [73], kindly delete "Kabushik" and insert -- Kabushiki --.

Signed and Sealed this

Twenty-ninth Day of December, 1998

Attest:

BRUCE LEHMAN

Attesting Officer     Commissioner of Patents and Trademarks